(12) United States Patent
Burg

(10) Patent No.: US 7,168,382 B2
(45) Date of Patent: Jan. 30, 2007

(54) BEACHABLE HIGH SPEED MARINE VEHICLE

(76) Inventor: Donald E. Burg, 15840 SW. 84th Ave., Miami, FL (US) 33157

( * ) Notice: Subject to any disclaimer, the term of this patent is extended or adjusted under 35 U.S.C. 154(b) by 227 days.

(21) Appl. No.: 10/887,095

(22) Filed: Jul. 7, 2004

(65) Prior Publication Data

US 2006/0005755 A1    Jan. 12, 2006

(51) Int. Cl.
*B63B 1/34*    (2006.01)

(52) U.S. Cl. ..................... 114/67 A; 180/126
(58) Field of Classification Search ............. 114/67 A, 114/260, 271, 288, 289, 290; 180/126, 127, 180/128
See application file for complete search history.

(56) References Cited

U.S. PATENT DOCUMENTS

| | | | | |
|---|---|---|---|---|
| 2,694,996 A | * | 11/1954 | Poche | ......................... 114/260 |
| 4,135,468 A | * | 1/1979 | Kirby et al. | ................. 114/260 |
| 5,462,002 A | * | 10/1995 | Wendt et al. | ................ 114/260 |
| 6,199,496 B1 | * | 3/2001 | Burg | ......................... 114/67 A |
| 6,487,981 B1 | * | 12/2002 | Burg | ......................... 114/67 A |

* cited by examiner

*Primary Examiner*—Lars A. Olson
(74) *Attorney, Agent, or Firm*—Robert J. Van Der Wall

(57) ABSTRACT

Presented is a beachable high speed marine vehicle with air cushioned hull(s) capable of transporting heavy loads at very high speeds to beachheads and then departing the beachhead under its own power. The artificially pressurized air cushions allow the bow of the vehicle to be raised to the water surface at all speeds including when stationary. The design of the forward end of the air cushion recesses allows both high speed breaking of water from the hull at that point and backing off of the beachheads in spite of sand, rocks, and the like being inside the air cushion forward end. An optional upward raising secondary bow is also described. Monohull, multi-hulled such as catamaran, and outrigger hull versions of the same conceptual invention are disclosed with all derived from the same basic concepts regarding loading and unloading of cargo, beaching abilities, air cushion performance, and other features.

49 Claims, 14 Drawing Sheets

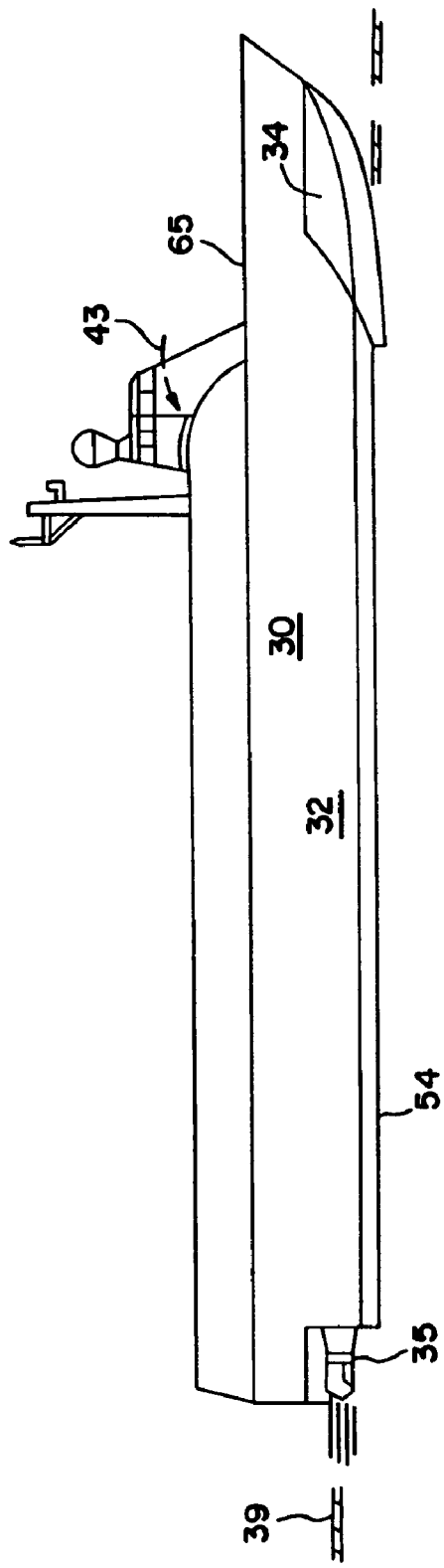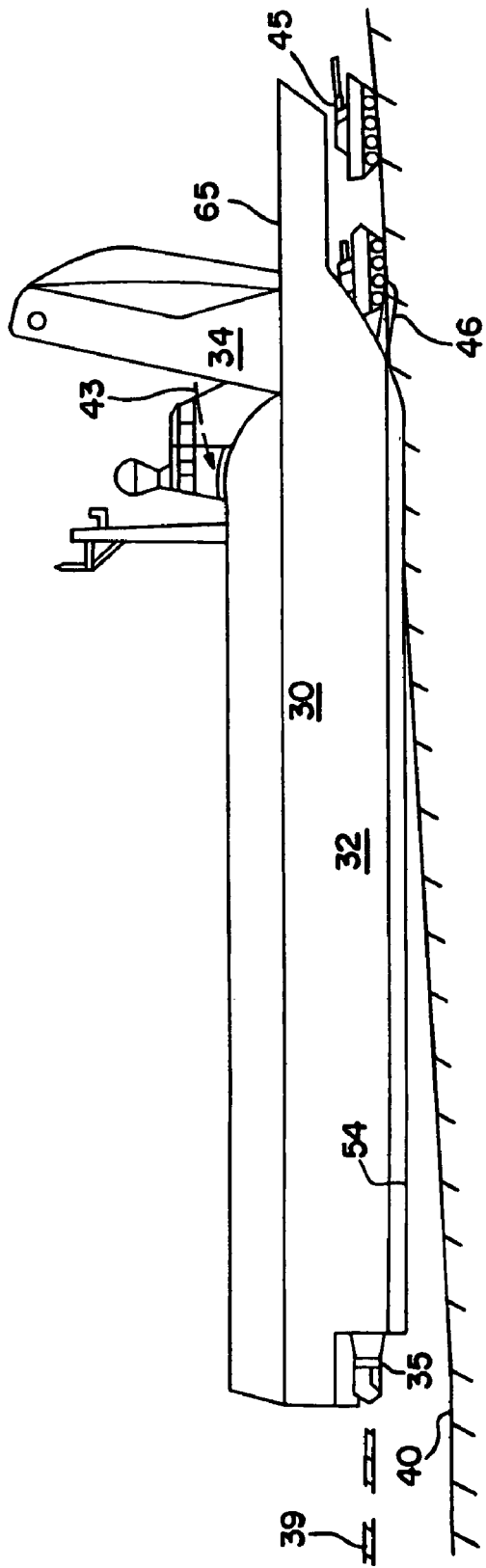

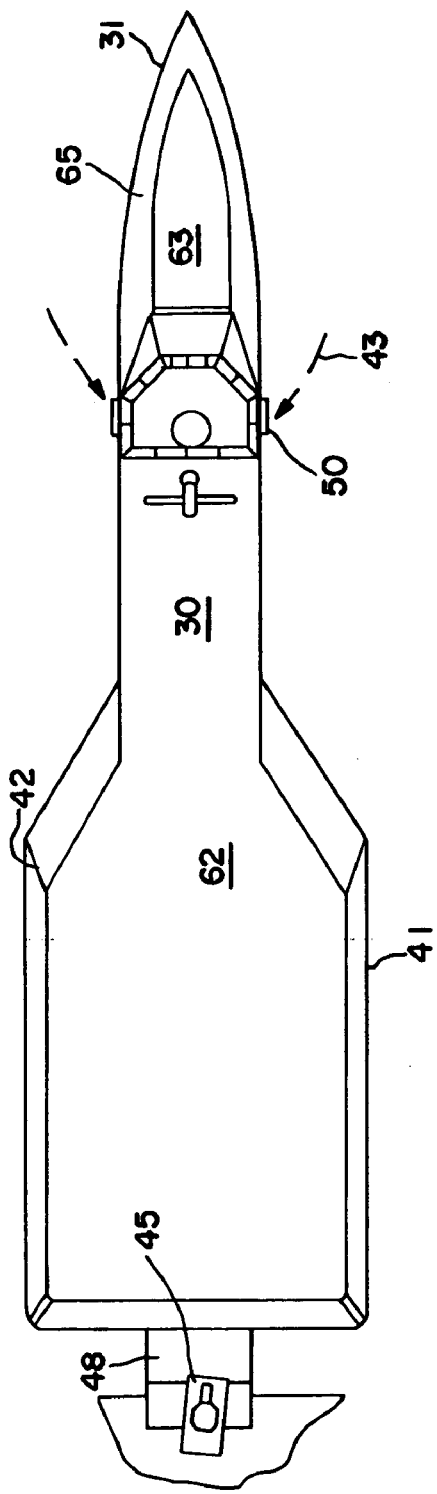
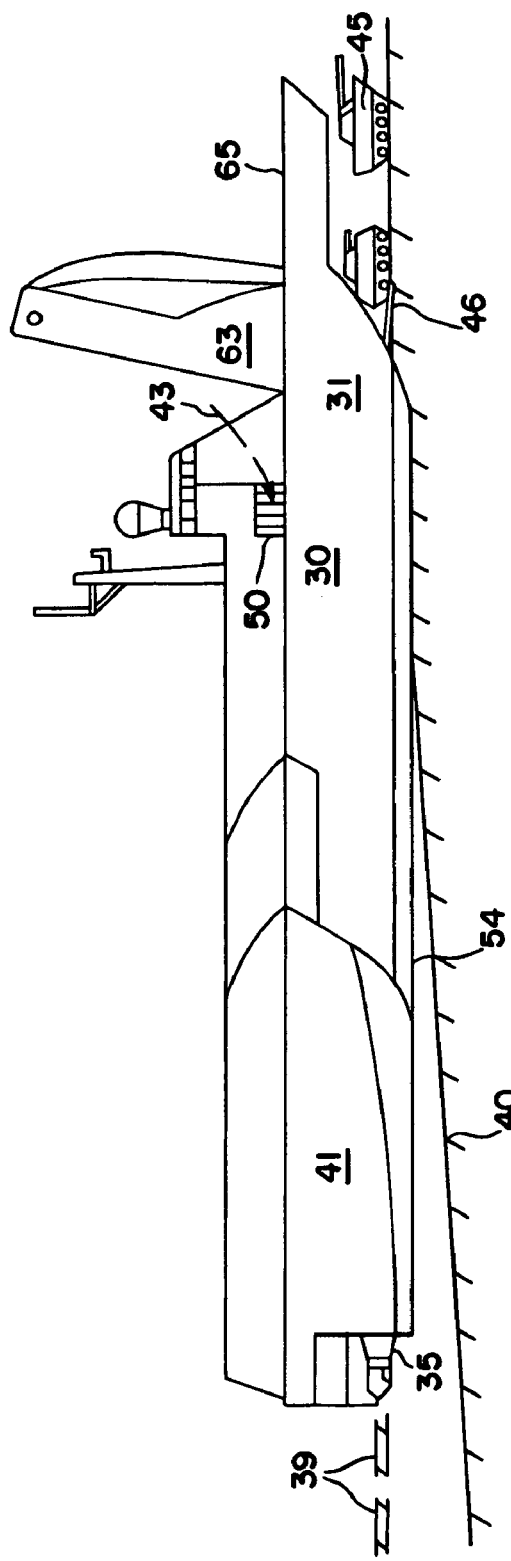

BEACHABLE HIGH SPEED MARINE VEHICLE

FIELD OF THE INVENTION

This instant invention relates to the field of beachable marine vehicles that are sometimes referred to as landing craft. These marine vehicles are not amphibious. The instant invention combines its beachability with air cushion(s) disposed in the underside of its hull. The air cushion(s) provide superior efficiency at high speeds, extreme shallow draft, and the ability to beach and unload cargo and then disembark the beachhead.

BACKGROUND OF THE INVENTION

One of the primary military purposes of beachable marine vehicles is to transport cargo such as vehicles and troops from ships at sea to beachheads. These beachable marine vehicles also have commercial application where they may transport cargo to unimproved beach areas. The U.S. Navy has workhorse vessels for this purpose such as the LCU (Landing Craft Utility) and related marine vehicles. The LCU is an almost flat bottomed monohull which is necessary so that it can drive on and off of beachheads; however, this design makes the LCU and its brethren very uncomfortable in rough seas. A further and most significant shortcoming of the LCU is that it has limited speed capabilities. In the cast of the LCU, the loaded top speed is only 9–12 knots.

A more recent development than the LCU is the LCAC (Landing Craft Air Cushion). The LCAC is a SES (Surface Effect Ship), also known as a hovercraft, with a pressurized air cushion that supports the full vehicle weight. The LCAC has a flat cargo deck with a blower pressurized air cushion underneath that is surrounded by 360 degrees of flexible skirts or seals. As such, the LCAC can run up onto beaches with limited slopes and is therefore fully amphibious. The LCAC has speed capabilities in the 45 knot area but has very limited rough sea capabilities. Further, the gas turbine powered LCAC is very expensive to start with, has a high fuel burn rate, and its flexible full perimeter skirts are high maintenance and expensive to replace.

These preceding noted limitations of current landing craft designs, such as the design concepts incorporated into the LCU or the LCAC, make them inappropriate for the Army TSV (Theater Support Vessel), the Navy and Marine Corps Sea Basing program HSC (High Speed Connector), the Navy Fleet Readiness and Logistics Office, and Naval Sea Systems Command (NAVSEA) RSLS (Rapid Strategic Lift Ship), or the Navy LCS (Littoral Combat Ship).

The TSV must transit oceans on occasion so a rather large high speed and seaworthy vessel is required. The Army has tested existing commercial passenger/vehicle catamaran ferries for the TSV program and they do show some promise but are not beachable due to deep draft requirements.

In the case of the Sea Basing program large parent ships are stationed 100 to 200 miles offshore so a HSC design that offers high speed and beachability to run between these parent ships and beachheads is demanded. There are a number of HSC sizes required with the smallest being about 170×50 feet and capable of transporting over 200 tons of cargo at 40 knots or more.

The RSLS must have trans-oceanic capabilities with one of its primary missions being to transport large CH-53 Super Stallion and other helicopters to world trouble spots and, after delivering the helicopters from an on-board helicopter pad, be able to support hostile beachheads. The RSLS must also be able to, along with the helicopters, transport up to 1,000 troops and their equipment including armored vehicles, supply containers, and the like.

The LCS is a high speed combatant that will operate in enemy littorals. It is somewhat smaller than a destroyer but quite capable as a small combatant. The LCS project is currently in the final design stages with two designs under consideration. The first is a monohull and the second a trihull with a long slender main hull and outrigger hulls either side. Neither of the two competing LCS designs have the advantages of an air cushioned hull as does the instant invention. These advantages include: 1) Beachability, 2) Extreme shallow draft, 3) Reduced underwater magnetic signature, and 4) Reduced shock loads on the hull structure in the event of an underwater blast proximal the hull.

The inventive beachable high speed marine vehicle proposed herein meets the requirements of the TSV, HSC, HSLS, and LCS as well as any other military or commercial requirement where a very efficient, high speed, seaworthy, and beachable marine vehicle is required. While many sizes of the instant invention are feasible, a particular size of the instant invention that meets the requirements of the TSV, a large size HSC, HSLS, and LCS has been subject to preliminary design studies. Based on the requirement that it have a beam of less than 105 feet so that it will pass through the Panama Canal, the selected design is approximately 360×104 feet and can transport 1,000 tons of cargo and fuel at speeds of 40–50+ knots. The instant invention is timely and offers service required features that cannot be provided in combination by other marine vehicles.

SUMMARY OF THE INVENTION

The primary object of the instant invention is to provide an advanced beachable marine vehicle capable high speeds and of beaching and then disembarking from the beach.

A related object of the invention is that said advanced beachable marine vehicle include a first water contacting hull member wherein there is a first artificially pressurized gas cushion in the underside of the first water contacting hull member that supports a portion of displacement.

A further object of the invention is that there be a first moveable, in relation to the advanced beachable marine vessel, secondary bow member disposed, at least in its majority, forward of the first artificially pressurized gas cushion.

A directly related object of the invention is that upward movement of the first moveable secondary bow member raises the first moveable secondary bow member leaving a first forward opening in the first water contacting hull member thereby allowing discharge of cargo from the first forward opening in the first water contacting hull member.

Yet another object of the invention is that an aft portion of the first moveable secondary bow member, when in its lowermost position, is, on average, disposed lower than a forward portion of the first artificially pressurized gas cushion.

A related object of the invention is that the first moveable secondary bow member overlaps lower portions of the first water contacting hull member of the advanced beachable marine vehicle over at least a majority of a width of the first moveable secondary bow member.

Another object of the invention is that a bow portion of the first water contacting hull member extends forward further than the first moveable secondary bow member.

A further object of the invention is that the first moveable secondary bow member is, at least in part, hinged to the first water contacting hull member.

Still another object of the invention is that, on average when the keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 60 degrees.

A directly related further refining object of the invention is that, on average when the keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 50 degrees.

Still another related further refining object of the invention is that, on average when the keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 40 degrees.

One more object of the instant invention is that a cargo deck be disposed below a main deck of the advanced beachable marine vehicle and proximal to and, at least in its majority, above a first artificially pressurized gas cushion recess.

A directly related object of the invention is that sides of the first artificially pressurized gas cushion recess, at least in their majority, taper inward toward a vertical centerline plane of the first water contacting hull member.

Yet another object of the invention is that a first forward moveable, in relation to the advanced beachable marine vehicle, ramp wherein said first forward moveable ramp acts as a portion of a bow of the first water contacting hull member when the first moveable secondary bow member is in an upward position.

Another object of the invention is that a first forward moveable ramp be deployable downward to allow discharge of cargo from the first forward opening in the first water contacting hull member.

Yet another object of the invention is that it further include a moveable, in relation to the advanced beachable marine vehicle, first stem ramp disposed proximal an aft end of the first water contacting hull member wherein said first stem ramp acts to restrict water from entering a cargo area of the first water contacting hull member when in its upward position and allowing cargo loading when in its downward position.

An object of the invention related to hull shape is that an aft end of the first artificially pressurized gas cushion be angled to horizontal over a majority of its width.

Still another object of the invention is that a second artificially pressurized gas cushion be disposed in an underside of a second water contacting hull member.

A directly related object of the invention is that it further include a second moveable secondary bow member disposed, at least in its majority, forward of said second artificially pressurized gas cushion.

Another object of the invention is that a lower aft end of a connecting hull portion that, when two water contacting hull members are used, connects the first and the second water contacting hull members is angled to horizontal over a majority of its width.

Still another object of the invention is that it may include a first stabilizing outrigger hull disposed, at least in its majority, outboard of the first water contacting hull member.

A directly related object of the invention is that it may include a second stabilizing outrigger hull disposed, at least in its majority, outboard of the first water contacting hull member.

Yet another object of the invention is that it may consist of only one water contacting hull member.

Another object of the invention is that it further include a locking actuator means to lock the first moveable secondary bow to the first water contacting hull member when the first moveable secondary bow is in its lower position wherein said locking actuator be disposed proximal a forward end of the first water contacting hull member.

Yet another object of the invention is that it further include a locking actuator means to lock the first moveable secondary bow to the first water contacting hull member when the first moveable secondary bow is in its lower position wherein said locking actuator be disposed proximal a forward end of the first moveable secondary bow.

BRIEF DESCRIPTION OF THE DRAWINGS

FIG. 2 gives a profile view of the marine vehicle presented in FIG. 1 while it is operating at high speed. High speed is defined herein as speeds of 15 knots or greater.

FIG. 3 shows the vehicle of FIGS. 1 and 2 when it is beached and discharging cargo over a bow ramp. The cargo shown in this case consists of armored vehicles.

FIG. 24 presents a topside plan view of a variation of the instant invention but in this case with a single main hull and stabilizing outrigger hulls. Note that the single main hull is similar in concept as one of the sidehulls of the preferred embodiment concepts presented previously herein. The instant invention beachable marine vehicle is stationary and loading vehicles through a stem ramp in this illustration.

FIG. 25 shows a profile view of the variation of the instant invention presented in FIG. 24. Note the stabilizing outrigger hull shown here.

DETAILED DESCRIPTION

Figure 1:
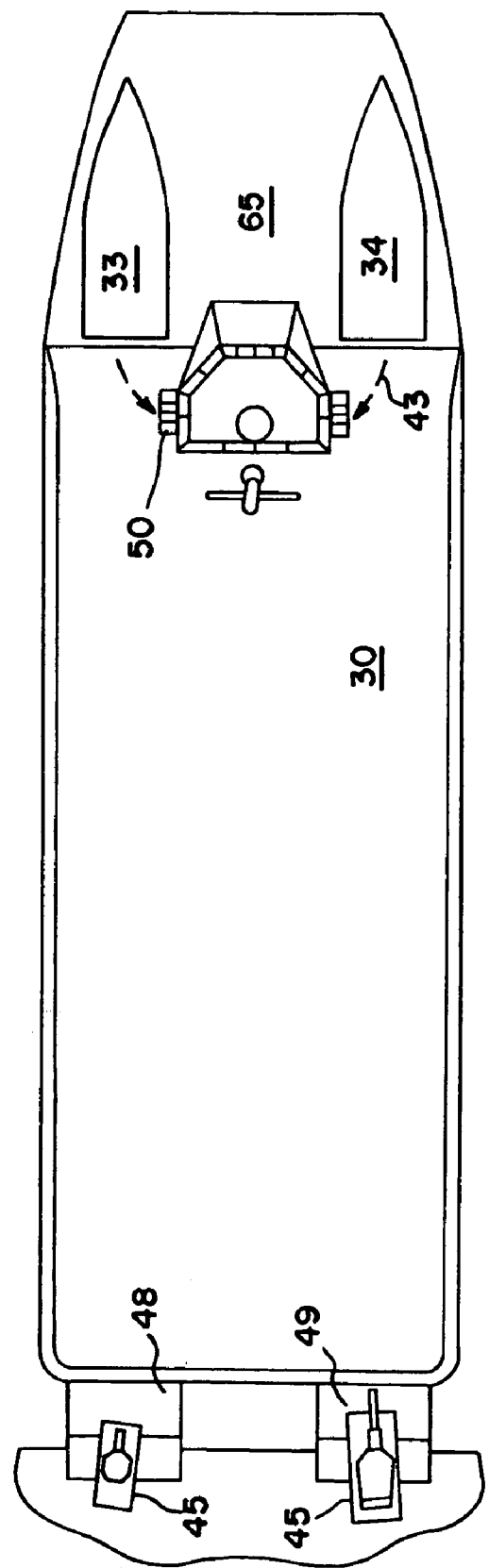
FIG. 1 presents a topside or plan view of a catamaran hull version of the instant invention beachable high speed marine vehicle. In this case it is loading armored vehicles from a dock or a supply ship by means of stern ramps.

FIG. 1 presents a topside or plan view of a catamaran hull version of the instant invention beachable high speed marine vehicle 30. In this case it is loading armored vehicles 45 from a dock or a supply ship by means of its stem ramps 48. Also shown are a forward portion of the main deck 65, gas cushion pressurizing blower gas inlets 50, gas flow arrows 43, and a port secondary moveable bow 33 and a starboard secondary moveable bow 34.

FIG. 2 gives a profile view of the marine vehicle 30 presented in FIG. 1 while it is operating at high speed. High speed is defined herein as speeds of 15 knots or greater. Shown are the starboard sidehull 32, keel 54, propulsor 35, and waterline 39.

FIG. 3 shows the beachable marine vehicle 30 of FIGS. 1 and 2 when it is beached and discharging cargo, in this case armored vehicles 45, over a bow ramp 46. Note the sloping beach or ground 40 that, due to its natural slope, provides clearance under the aft end of the beachable marine vehicle 30.

Figure 4:
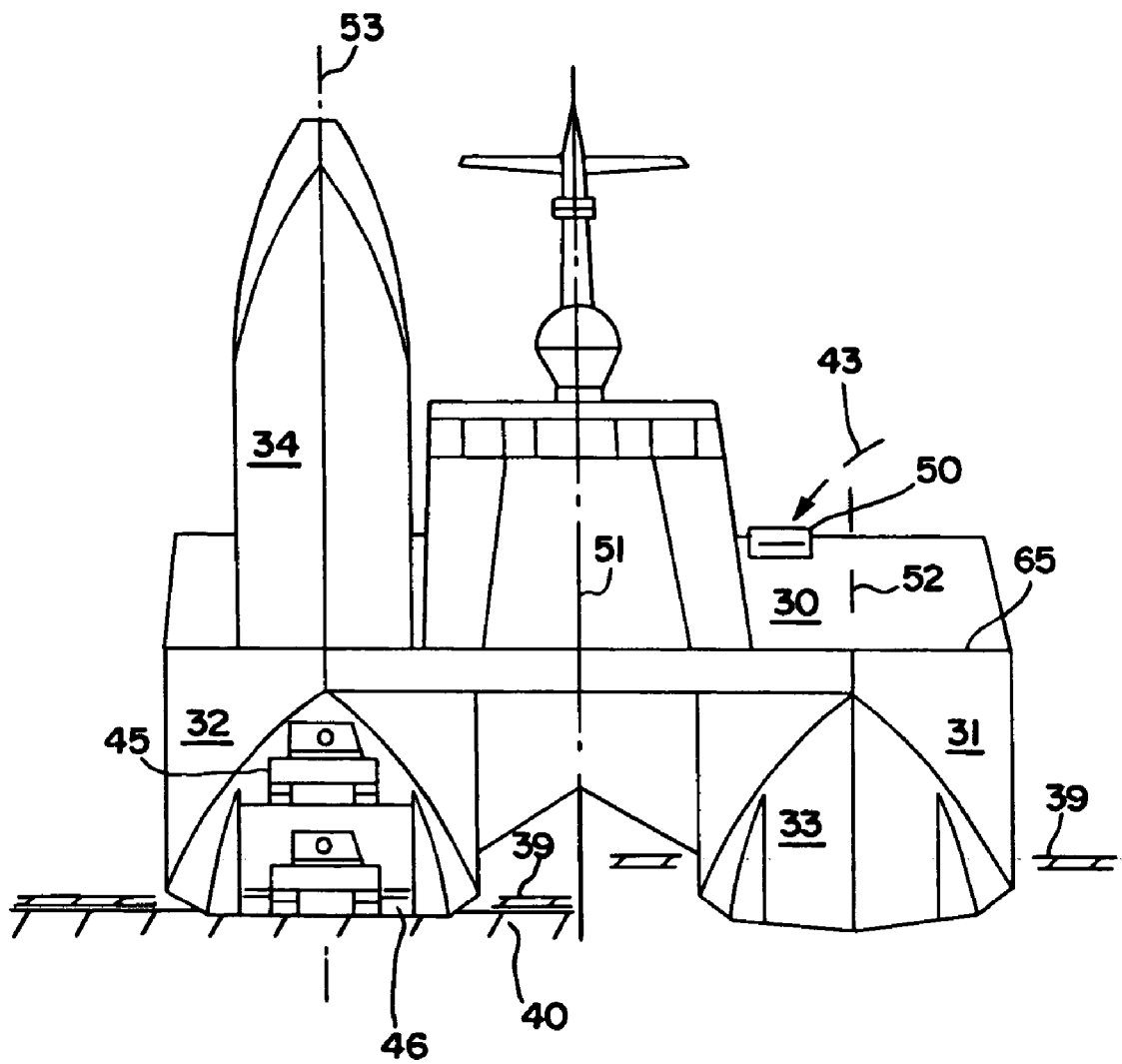
FIG. 4, in its port side bow view, shows the port side of the instant invention marine vehicle of FIG. 2 that is operating at high speed. The starboard side bow view of FIG. 4 shows the starboard side of the instant invention marine vehicle depicted in FIG. 3 when it is unloading armored vehicles at a beachhead.

FIG. 4, in its port side bow view, shows the port sidehull 31 including the port side secondary moveable bow 33 of the instant invention marine vehicle 30 of FIG. 2 that is operating at high speed. The starboard side bow view of FIG. 4 shows the starboard sidehull 32 of the instant invention marine vehicle 30 depicted in FIG. 3 when it is unloading armored vehicles 45 at a beachhead. Also shown are the centerline vertical plane 51, port sidehull centerline vertical plane 52, and starboard sidehull vertical centerline plane 53.

Figure 5:
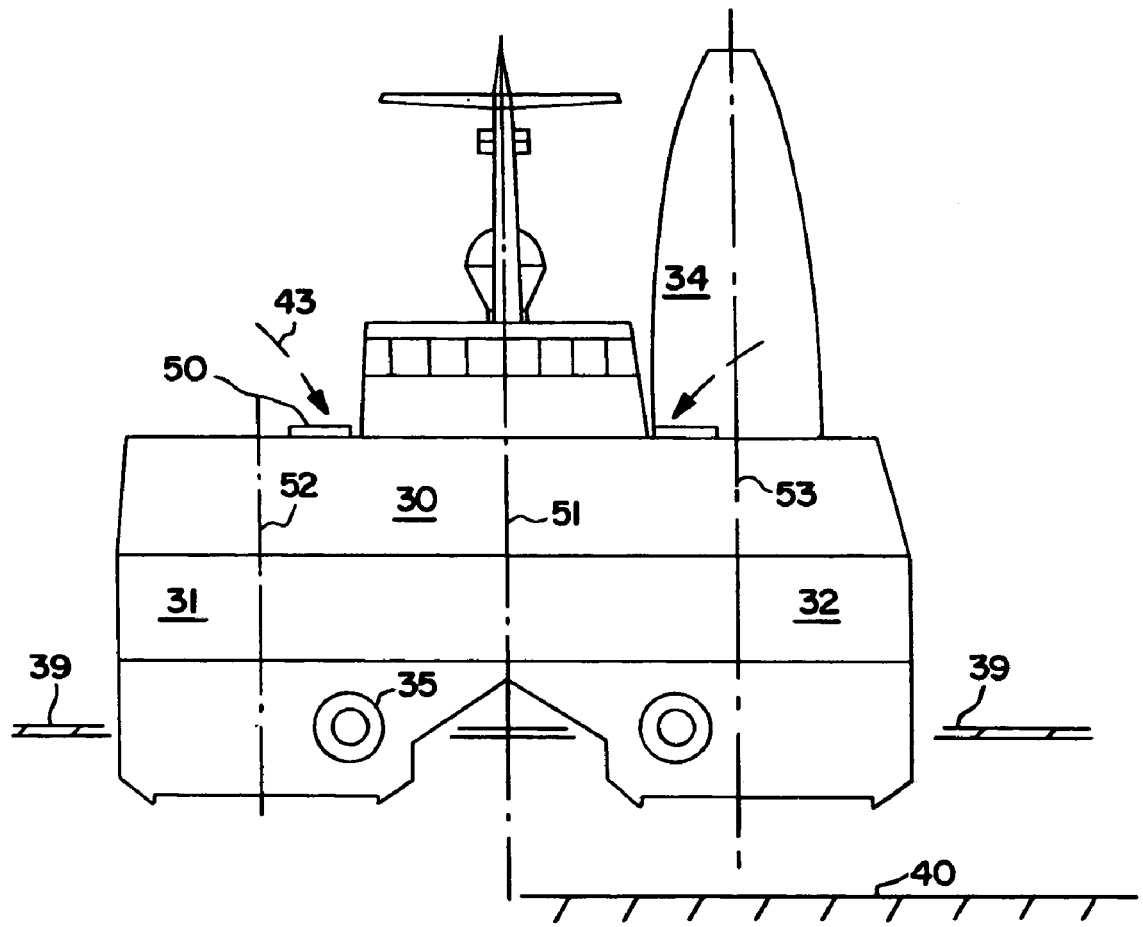
FIG. 5, in its port side stern view, shows the port side of the instant invention marine vehicle presented in FIG. 2 that is underway at high speed. The starboard side stern view of FIG. 5 shows the starboard side of the instant invention marine vehicle depicted in FIG. 3 that is unloading armored vehicles at a beachhead.

FIG. 5, in its port side stern view, shows the port side of the instant invention marine vehicle 30 presented in FIG. 2 that is underway at high speed. The starboard side stem view of FIG. 5 shows the starboard side of the instant invention marine vehicle 30 depicted in FIG. 3 that is unloading armored vehicles at a beachhead.

Figure 6:
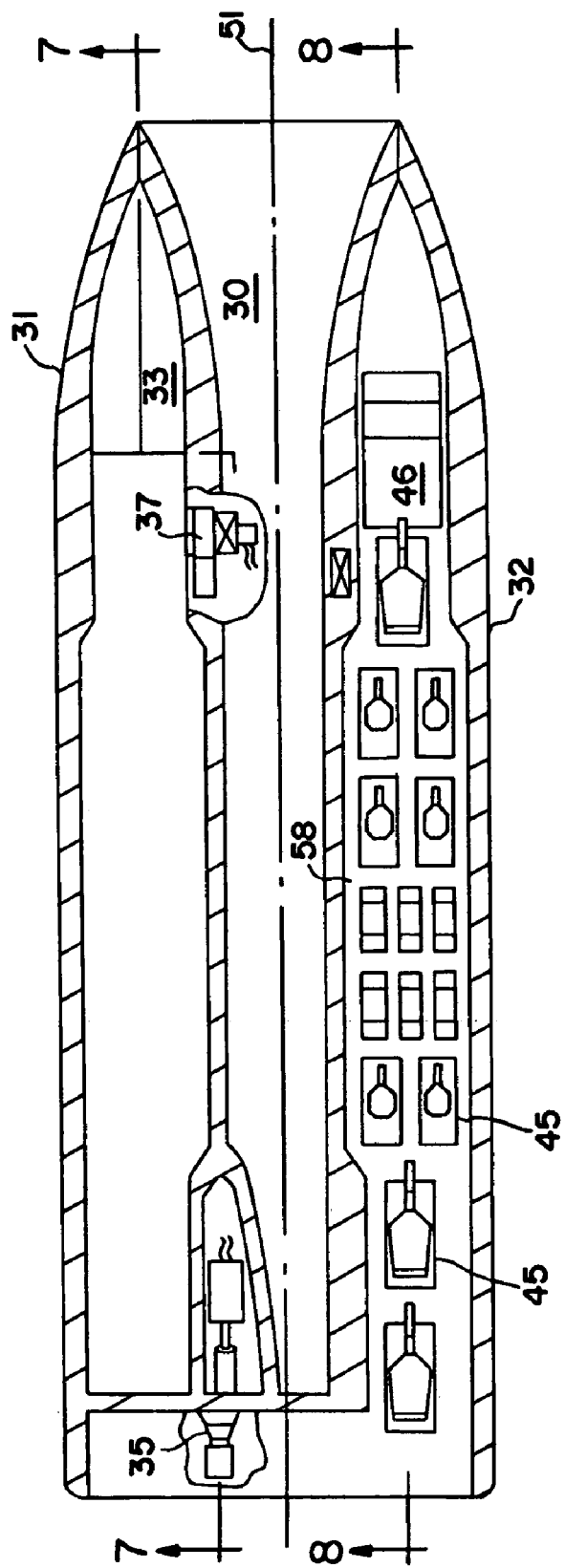
FIG. 6, in its port side top or plan view with the main deck removed for clarity, shows machinery arrangements of the instant invention marine vehicle presented in FIG. 2 that is underway at high speed. In the starboard side view of FIG. 6 is presented a top plan view, with the main deck removed, of the cargo deck layout which in this instance consists of armored vehicles that are ready for disembarkation at a beachhead as is the situation in FIG. 3.

FIG. 6, in its port side top or plan view with the main deck removed for clarity, shows machinery arrangements of the instant invention marine vehicle 30 presented in FIG. 2 that is underway at high speed. Machinery shown includes a gas cushion pressurizing blower 37 and propulsor 35. Also shown is a gas cushion 57, gas cushion recess 56, cargo area 58, and gas cushion stem seal 55. In the starboard side view of FIG. 6 is presented a top plan view, with the main deck removed, of the cargo deck 60 layout which in this instance consists of armored vehicles 45 that are ready for disembarkation at a beachhead over a bow ramp 46 as is the situation in FIG. 3.

Figure 7:
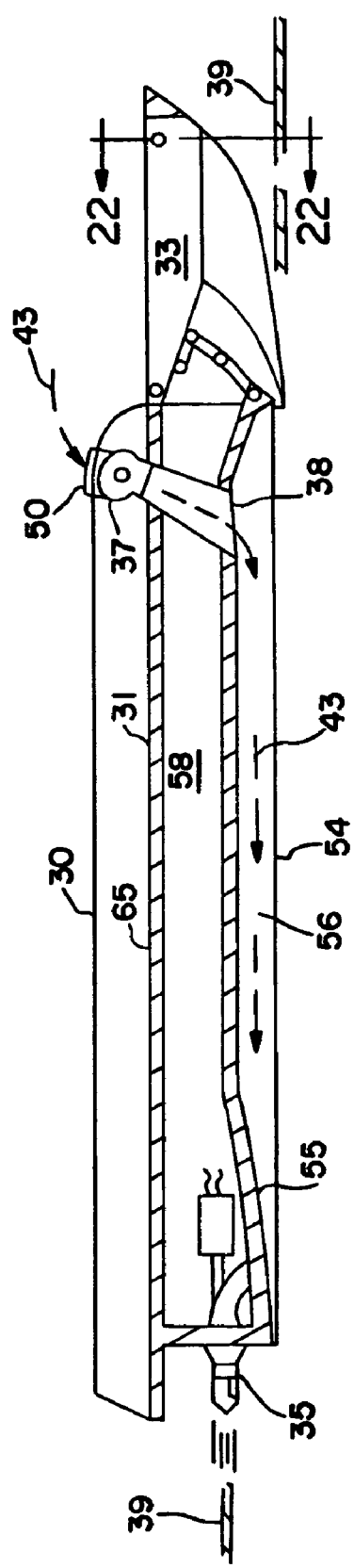
FIG. 7 is a cross-sectional view, as taken through plane 7—7 of FIG. 6, that shows machinery arrangements in elevation. Note that plane 7—7 here breaks outboard approaching the bow to simplify FIG. 7.

FIG. 7 is a cross-sectional view, as taken through plane 7—7 of FIG. 6, that shows machinery arrangements in elevation. Note that plane 7—7 here breaks outboard approaching the bow of the port sidehull 31 here to simplify FIG. 7.

Figure 8:
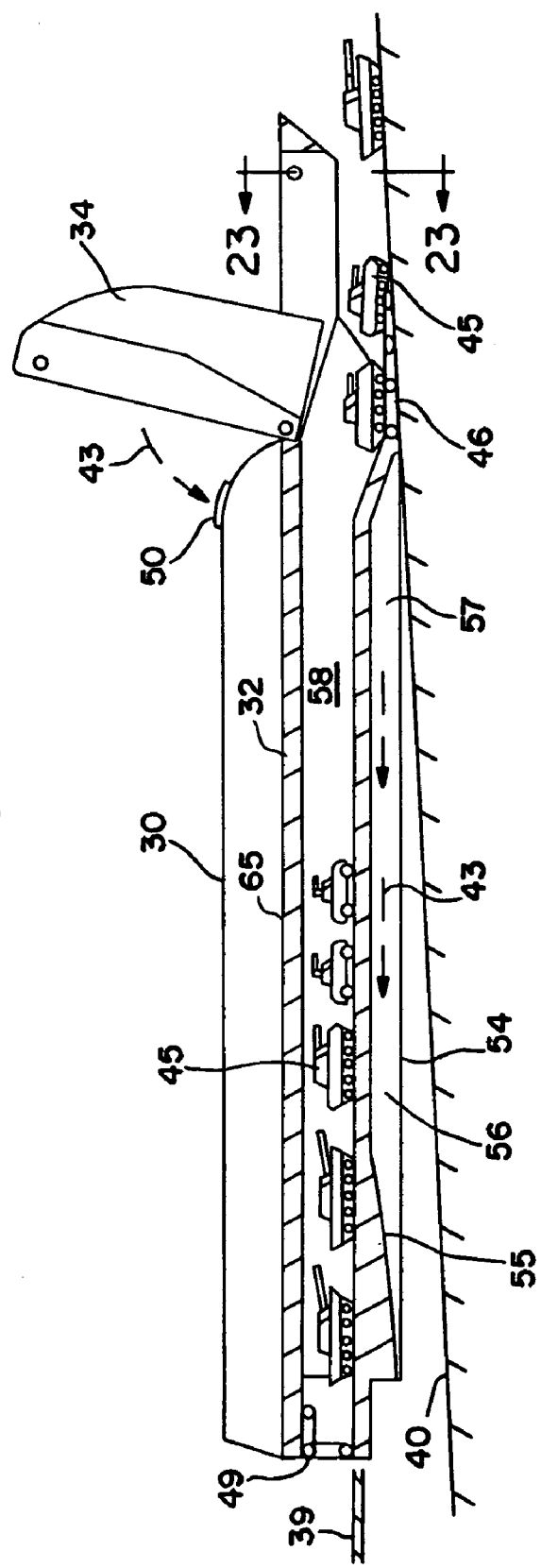
FIG. 8 is another cross-sectional view, as taken through plane 8—8 of FIG. 6, that shows the cargo deck which in this case is unloading armored vehicles at a beachhead.

FIG. 8 is another cross-sectional view, as taken through plane 8—8 of FIG. 6, that shows the cargo deck 60 which in this case is unloading armored vehicles 45 at a beachhead. The starboard sidehull 32 has its secondary moveable bow 34 raised here.

Figure 9:
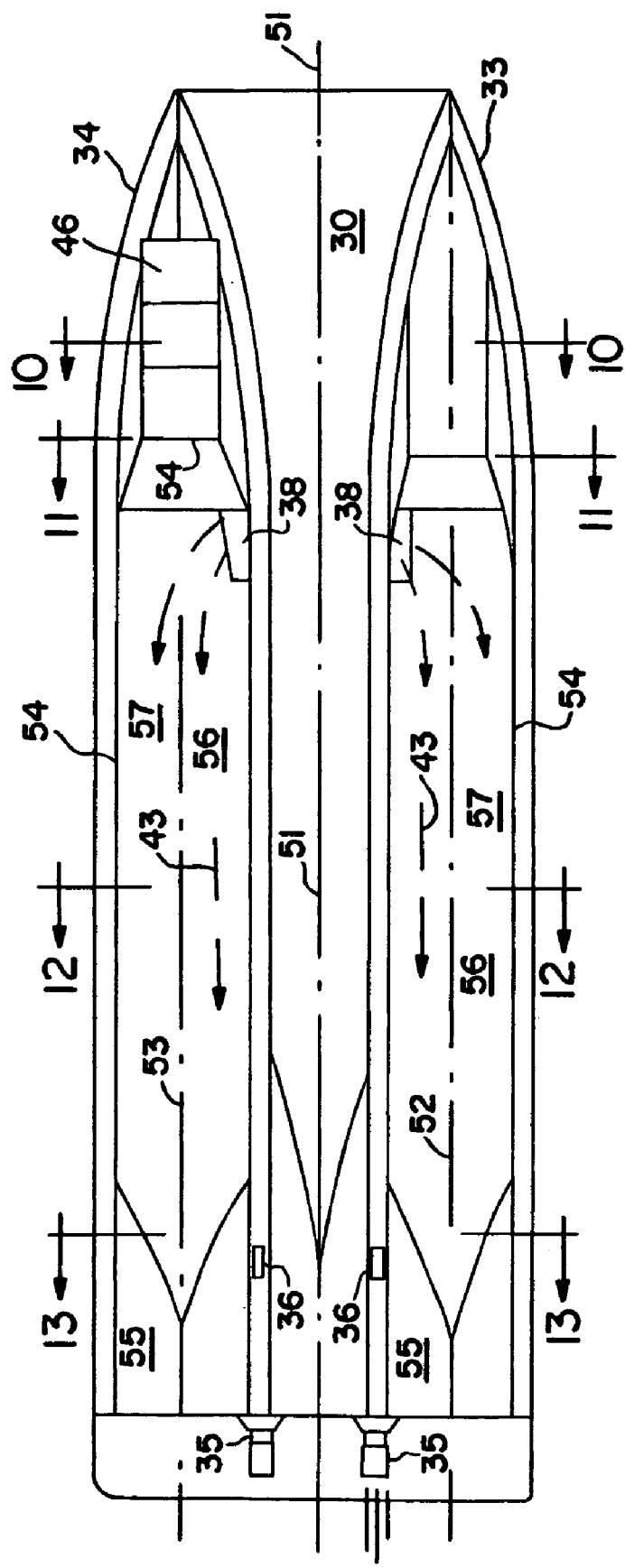
FIG. 9 is a bottom plan view showing the underside of a preferred embodiment of the instant invention marine vehicle. The port side shows vehicle operation at high speed as is the case in FIG. 2 and the starboard side shows the underside at a beachhead with a bow ramp deployed as is the case presented in FIG. 3.

FIG. 9 is a bottom plan view showing the underside of a preferred embodiment of the instant invention marine vehicle 30. The port side shows vehicle operation at high speed as is the case in FIG. 2 and the starboard side shows the underside at a beachhead with a bow ramp 46 deployed as is the case presented in FIG. 3. Blower discharges openings 38 and propulsor water inlets 36 are also shown.

Figure 10:
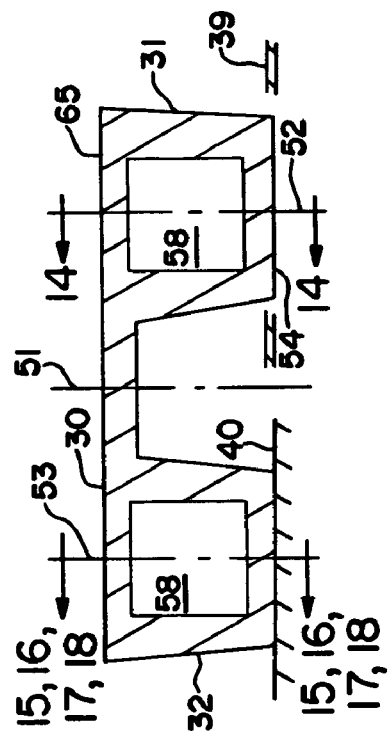
FIG. 10 is a cross-section, as taken through plane 10—10 of FIG. 9, that shows a moveable secondary bow down and locked into position during high speed operation on the port side view. The starboard side view presents the starboard side moveable bow when disposed upward during beaching operations.

FIG. 10 is a cross-section, as taken through plane 10—10 of FIG. 9, that shows, in this port side view, the port side moveable secondary bow 33 down and locked into position during high speed operation. The starboard side view presents the starboard side moveable secondary bow 34 when disposed upward during beaching operations.

Figure 11:
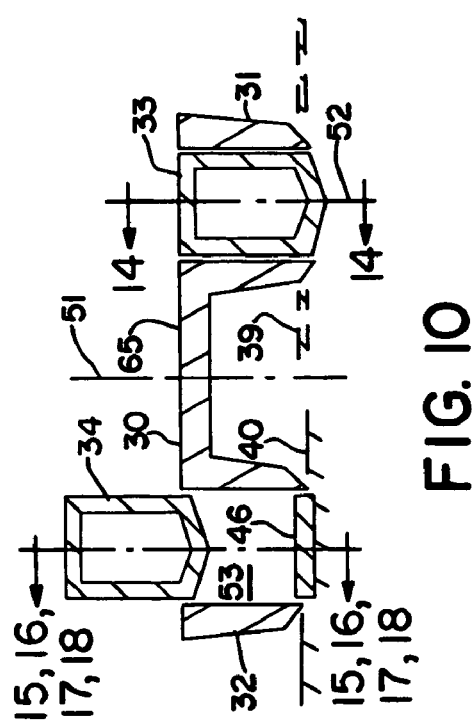
FIG. 11 presents a cross-section, as taken through plane 11—11 of FIG. 9, that shows the hull structure at this location that is just forward of the gas cushions.

FIG. 11 presents a cross-section, as taken through plane 11—11 of FIG. 9, that shows the hull structure at this location that is just forward of the gas cushions.

Figure 12:
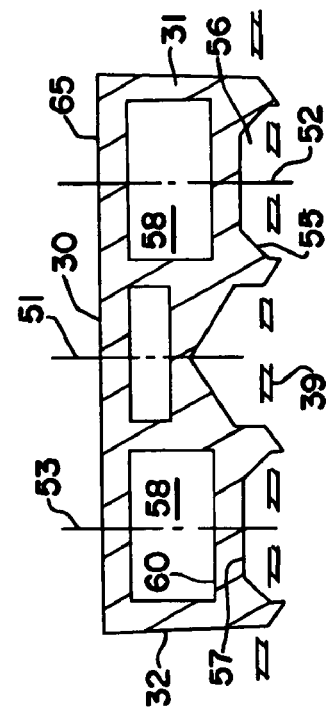
FIG. 12 presents a cross-section, as taken through line 12—12 of FIG. 9, that shows a preferred embodiment of the instant invention at approximately mid-ship. Note that the top of the gas cushion recesses are substantially parallel to the cargo deck here and the sides of the gas cushion recesses angle up from the keels either side of the gas cushions. This makes for an inherently strong and lightweight structural design and is considered a valuable feature of the instant invention. It is also possible to make other shapes, such as a curvilinear shape to the top of the gas cushion recesses, but in any case the cargo deck is proximal the top of the gas cushion recesses and the sides of the gas cushions angle upward, either in straight or curvilinear shapes, to the underside of the gas cushion recesses.

FIG. 12 presents a cross-section, as taken through line 12—12 of FIG. 9, that shows a preferred embodiment of the instant invention beachable marine vehicle 30 at approximately mid-ship. Note that the top of the gas cushion recesses 56 are substantially parallel to the cargo deck 60 here and the sides of the gas cushion recesses 56 angle up from the keels 54 either side of the gas cushions 57. This makes for an inherently strong and lightweight structural design and is considered a valuable feature of the instant invention. It is also possible to make other shapes, such as a curvilinear shape to the top of the gas cushion recesses 56, but in any case the cargo deck 60 is proximal the top of the gas cushion recesses 56 and the sides of the gas cushion recesses 56 angle upward, either in straight or curvilinear shapes, to the underside of the gas cushion recesses 56.

Figure 13:
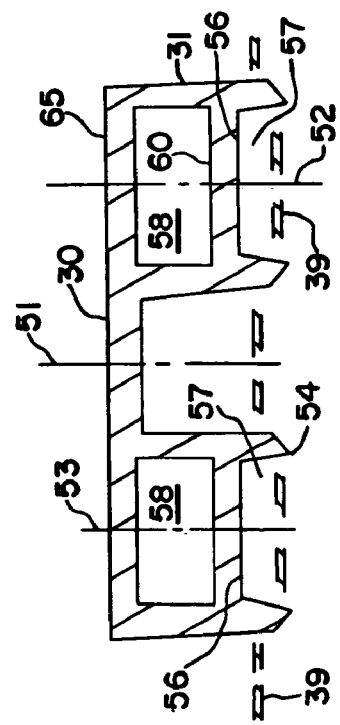
FIG. 13 gives a cross-section, as taken through plane 12—12 of FIG. 9, that shows a preferred embodiment of the instant invention proximal an aft end of the gas cushion recesses. Note the preferred shape of the gas cushion recess stern seals and of the inverted-V shape between the sidehulls here. These shapes give the best ride qualities in rough seas and are also inherently structurally strong. The use of the preferred embodiment inverted-V shape between the sidehulls aids in transiting the trough of the bow wave at intermediate or hump speeds and also aids in elevating the hull at high speeds thereby reducing wetted area which increases high speed efficiency. While the inverted-V shape shows in preferred, other shapes including an inverted-U shape, curvilinear shapes, or other may be used to effect.

FIG. 13 gives a cross-section, as taken through plane 12—12 of FIG. 9, that shows a preferred embodiment of the instant invention beachable marine vehicle 30 proximal an aft end of the gas cushions 56. Note the preferred shape of the gas cushion stem seals 55 and of the preferred inverted-V shape structure 61 between the sidehulls here. These shapes give the best ride qualities in rough seas and are also inherently structurally strong. The use of the preferred embodiment inverted-V shape structure 61 between the sidehulls 31, 32 aids in transiting the trough of the bow wave at intermediate or hump speeds and also aids in elevating the hull at high speeds thereby increasing high speed efficiency.

Figure 14:
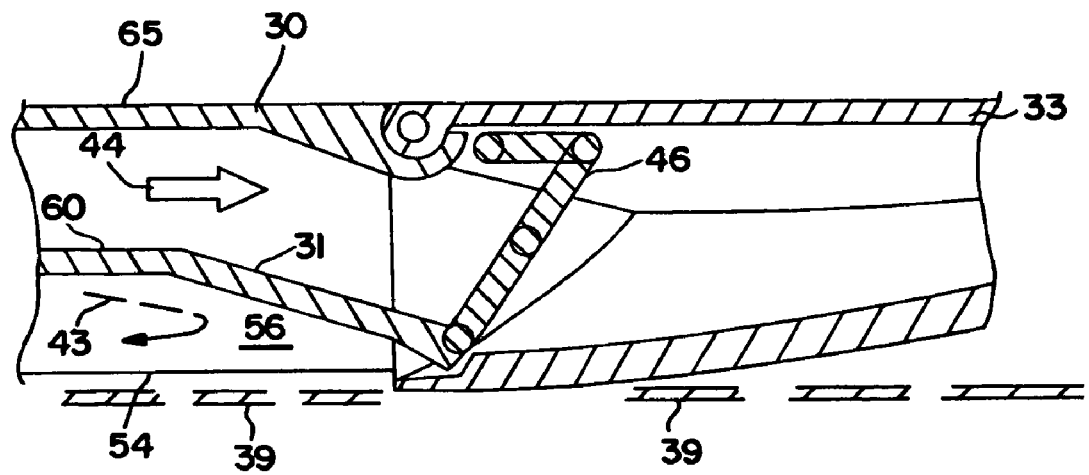
FIG. 14 presents a partial cross-sectional view, as taken through plane 14—14 of FIGS. 10 and 11, that shows a portion of the forward portion of the instant invention while underway traveling forward at high speed. Note that at least a portion of a forward end of the gas cushion is formed by an aft end of the moveable secondary bow in this preferred embodiment. This approach helps in getting a clean break of water at the forward end of the gas cushion during high speed operation.

FIG. 14 presents a partial cross-sectional view, as taken through plane 14—14 of FIGS. 10 and 11, that shows a portion of the forward portion of the instant invention beachable marine vehicle 30 while underway traveling forward at high speed. Note that at least a portion of a forward end of the gas cushion recesses 56 is formed by an aft end of the moveable secondary bow 33 in this preferred embodiment. A direction of movement arrow 44 indicating forward movement here is also shown.

Figure 15:
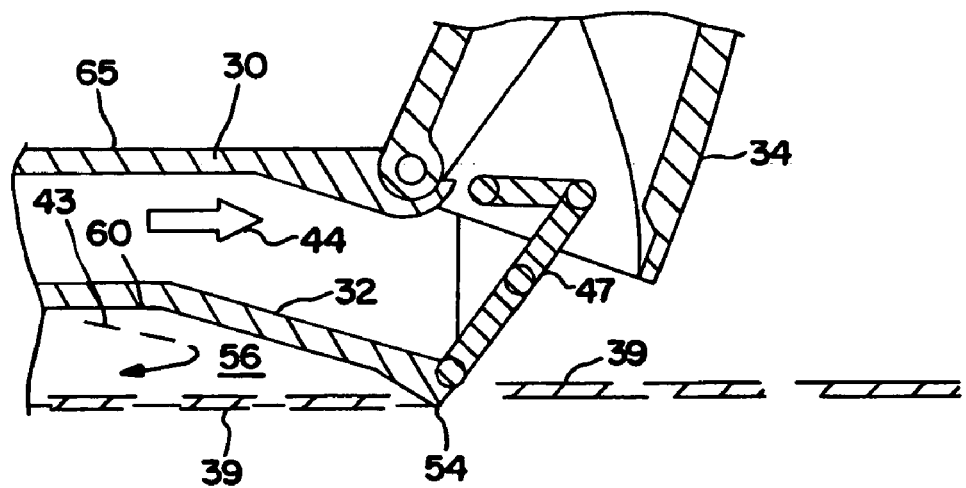
FIG. 15 shows a partial cross-sectional view, as taken through plane 15—15 of FIGS. 10 and 11, that illustrates forward movement with the moveable secondary bow raised. Note that forward movement in a seaway can be accomplished with the gas cushion pressurized and with or without the moveable secondary bow. If the secondary bow is not incorporated into the design, a simple fixed bow may be incorporated into the design and, though not shown, this is considered within the spirit and scope of the invention.

FIG. 15 shows a partial cross-sectional view, as taken through plane 15—15 of FIGS. 10 and 11, that illustrates forward movement with the moveable secondary bow 34 raised. Note that forward movement in a seaway can be accomplished with the gas cushion 57 pressurized and with or without the moveable secondary bow 34. If the secondary bow 34 is not incorporated in the design, a simple fixed bow may be incorporated into the design and, though not shown, this is considered within the spirit and scope of the invention.

Figure 16:
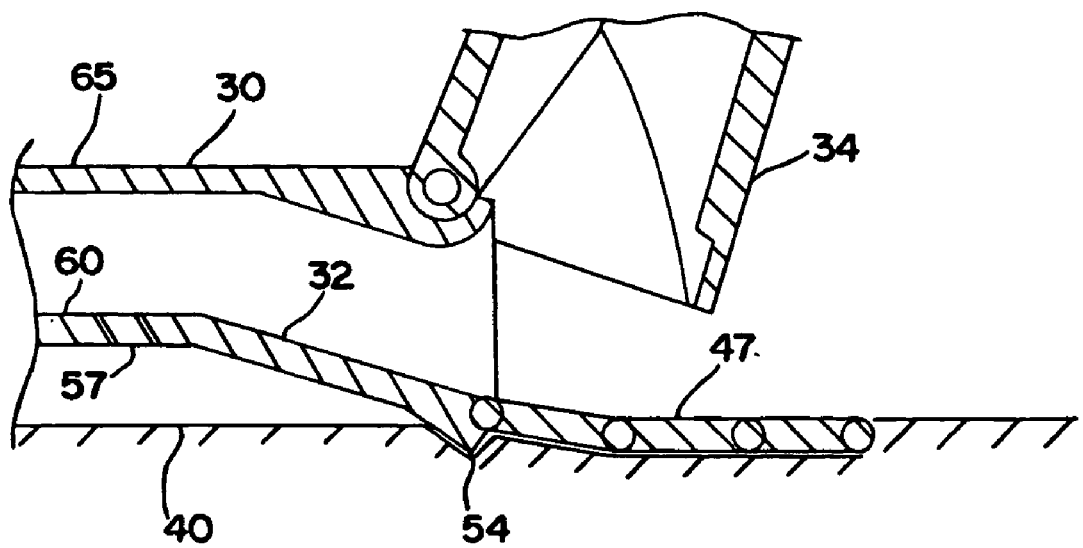
FIG. 16 presents a partial cross-sectional view, as taken through plane 16—16 of FIGS. 10 and 11, that shows the bow ramp deployed at a beachhead to allow discharge of cargo such as containers, vehicles, passengers, etc.

FIG. 16 presents a partial cross-sectional view, as taken through plane 16—16 of FIGS. 10 and 11, that shows the bow ramp 47 deployed at a beachhead to allow discharge of cargo such as containers, vehicles, passengers, etc.

Figure 17:
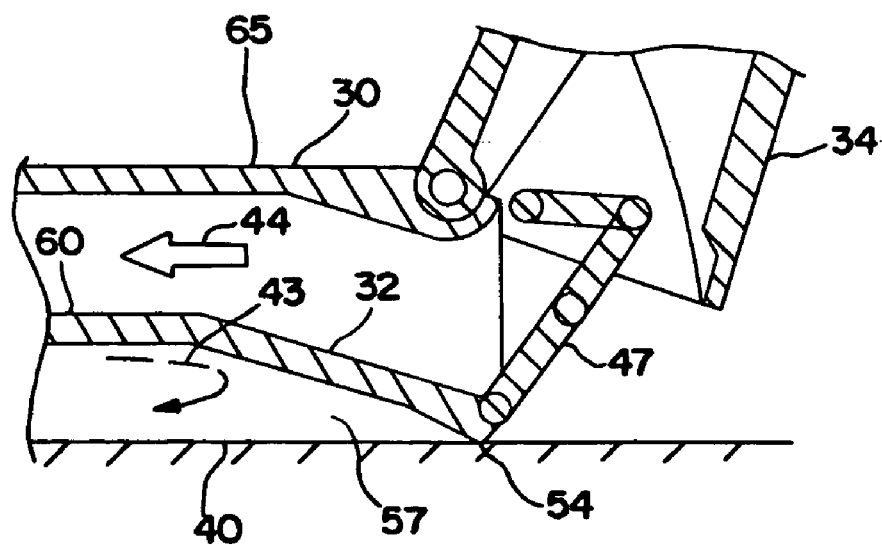
FIG. 17 gives a partial cross-sectional view, as taken through plane 17—17 of FIGS. 10 and 11. In this case, the bow ramp is retracted and the beachable marine vehicle is backing off of a beachhead.

FIG. 17 gives a partial cross-sectional view, as taken through plane 17—17 of FIGS. 10 and 11. In this case, the bow ramp 47 is retracted and the vehicle is backing off of a beachhead.

Figure 18:
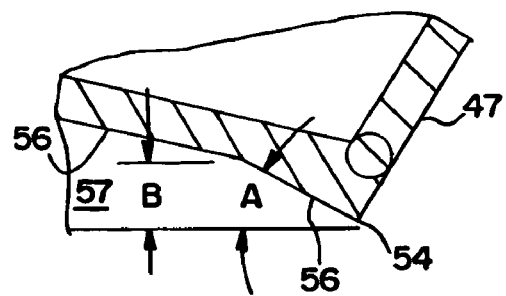
FIG. 18 is an enlargement of the bow area that defines preferred angles and other shapes at the forward end of the gas cushion(s). These parameters are selected to provide the ability to back off of beachheads and also break oncoming water clean from the hull proximal the forward end of the gas cushion(s) when moving forward.

FIG. 18 is an enlargement of the bow area that defines preferred angles and other shapes at the forward end of the gas cushion recesses 56. These parameters are selected to provide the ability to back off of beachheads and also break oncoming water clean from the hull proximal the forward end of the gas cushion recesses 56. It is defined that angle A should be less than certain values to horizontal when the marine vehicle 30 is sitting horizontal. These values are 60, 50, and 40 degrees. It is also defined that distance B should be, on average, at least four inches to make a clean water break at the forward end of the gas cushion 57 during high speed operation. This B distance of at least four inches also provides a minimum angled distance to insure that backing off of the piled up sand, rocks, etc. that have piled up in the front end of the gas cushion recess 56 is possible when disembarking a beachhead.

Figure 19:
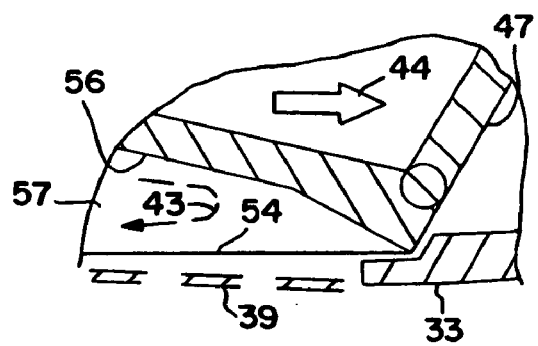
FIG. 19 presents an enlargement of the bow area that shows a preferred embodiment of a forward portion of the gas cushion(s) when traveling forward at high speed. Note that the water is breaking free from an aft end of the moveable secondary bow here.

FIG. 19 presents an enlargement of the bow area that shows a preferred embodiment of a forward portion of the gas cushion(s) 57 when traveling forward at high speed. Note that the water is breaking free from an aft end of the moveable secondary bow 33 here.

Figure 20:
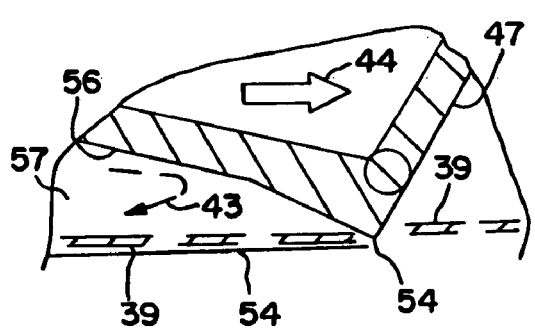
FIG. 20 is yet another enlargement of the bow area that is similar to that presented in FIG. 19 except that in this instance the moveable secondary bow is raised so that the water breaks free of the hull at a forward portion of an at least partially transversely oriented keel of the hull.

FIG. 20 is yet another enlargement of the bow area that is similar to that presented in FIG. 19 except that in this instance the moveable secondary bow, not shown in this figure, is raised so that the water breaks free of the hull at a forward portion of an at least partially transversely oriented portion of a keel 54 of the hull.

Figure 21:
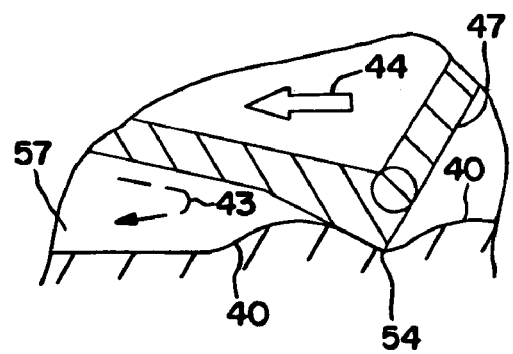
FIG. 21 presents another enlargement of the bow area that illustrates how having a shallow slope to the forward end of the gas cushions(s) allows disembarkment from the beach material may be caught in the forward end of the gas cushion recesses when beaching. Note that it is possible to have a variation of the instant invention wherein there is no forward moveable secondary bow. Such a design may lack the ability to discharge cargo from the cargo hold(s) as illustrated herein but would still be quite acceptable and within the spirit and scope of the instant invention. In such a design, cargo could be offloaded from the main deck or other decks using ramps, cranes, or other means.

FIG. 21 presents another enlargement of the bow area that illustrates how having a shallow slope to the forward end of the gas cushions(s) allows disembarkment from the beach material that is caught in the forward end of the gas cushion recess 56 when beaching. Note that it is possible to have a variation of the instant invention wherein there is no forward moveable secondary bow. Such a design may lack the ability to discharge cargo from the cargo hold(s) as illustrated herein but would still be quite acceptable and within the spirit and scope of the instant invention. In such a design, cargo could be preferably offloaded from the main deck or other decks using ramps, cranes, or other means.

Figure 22:
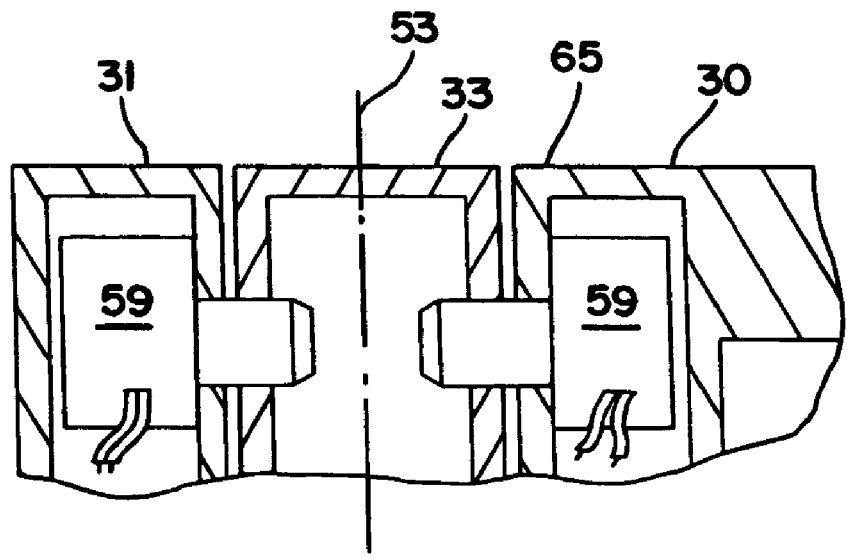
FIG. 22 is a partial cross-section, as taken through vertical plane 22—22 of FIG. 7, that illustrates a preferred means of locking into position a moveable secondary bow when said moveable secondary bow is down in its high speed position.

FIG. 22 is a partial cross-section, as taken through vertical plane 22—22 of FIG. 7, that illustrates a preferred means of locking into position a moveable secondary bow 33 when said moveable secondary bow 33 is down in its high speed position. This is accomplished by actuator means 59 that lock the moveable secondary bow 33 into position. It is important to note that, for best moment force advantage, the actuator means should be positioned forward near the ends of the bow(s). The actuator means 59 are shown in the fixed hull portion here but it is within the scope of the invention that they could be disposed in the secondary moveable hull itself.

Figure 23:
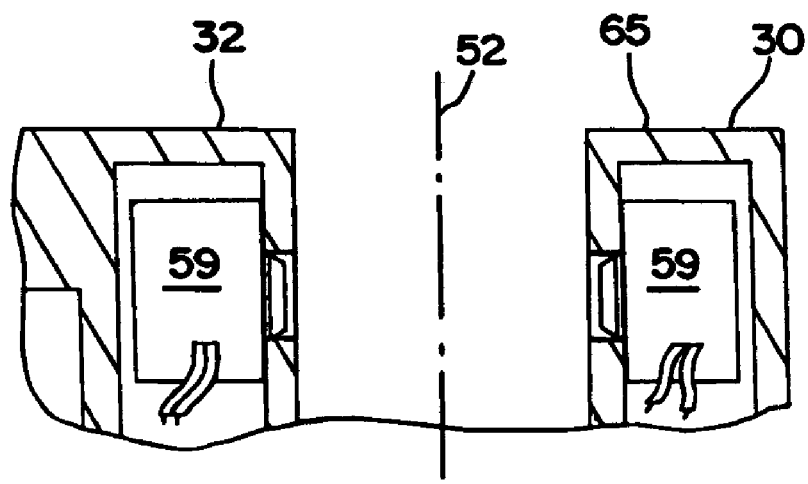
FIG. 23 presents a partial cross-section, as taken though vertical plane 23—23 of FIG. 8, that illustrates the same section as FIG. 22 but with the moveable secondary bow retracted upward for low speed and/or beaching operations.
Figure 28:
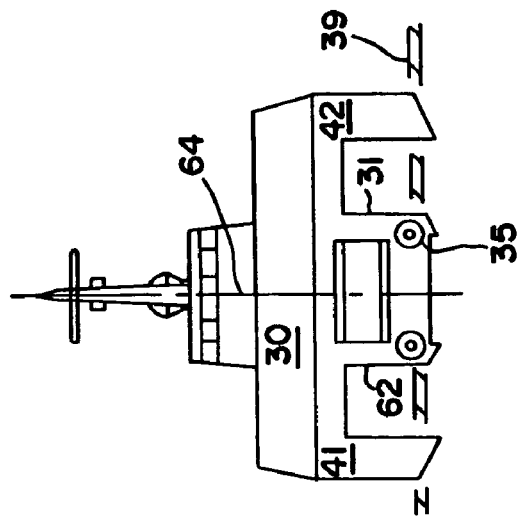

FIG. 23 presents a partial cross-section, as taken though vertical plane 23—23 of FIG. 8, that illustrates the same section as FIG. 22 but with the moveable secondary bow, not shown, retracted upward for low speed and/or beaching operations.

FIG. 24 presents a topside plan view of a variation of the instant invention beachable marine vehicle 30 but in this case with a single main hull 62 and stabilizing outrigger hulls 41, 42. Note that the single main hull 62 is similar in concept as one of the sidehulls of the preferred embodiment concepts presented previously herein. It is stationary and loading vehicles 45 through a stern ramp 48 in this illustration.

FIG. 25 shows a profile view of the variation of the instant invention presented in FIG. 24. Note the outrigger hull 41 shown here.

Figure 26:
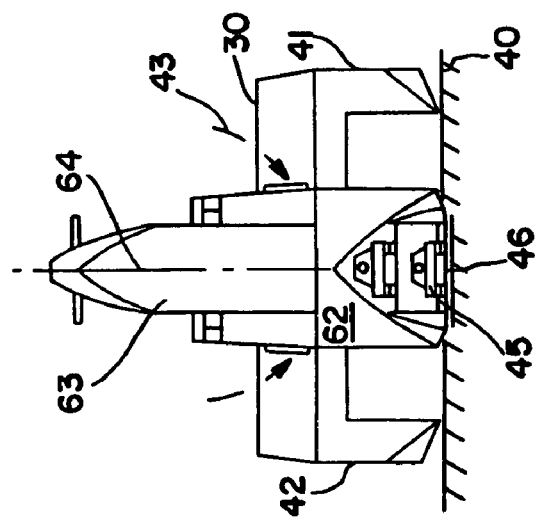
FIG. 26 presents a bow view of the variation of the instant invention given in FIG. 25. This is during beaching with its moveable secondary bow raised.

FIG. 26 presents a bow view of the variation of the instant invention beachable marine vehicle 30 given in FIG. 25. This is during beaching with its moveable secondary bow 63 raised. The vertical centerline plane 64.

Figure 27:
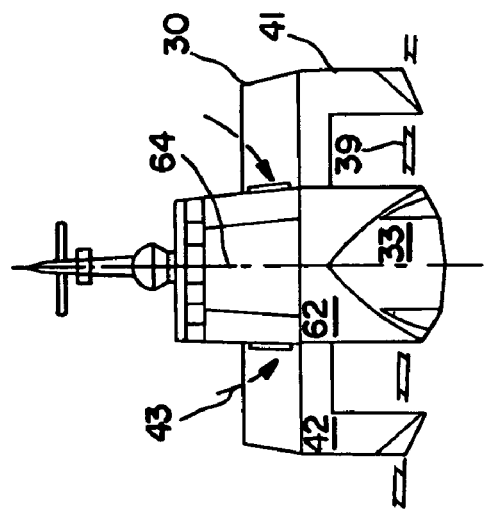
FIG. 27 gives a bow view of the instant invention shown in FIG. 24 but during high speed operation. While the outrigger hulls provide greater stability and more deck space, they are not absolutely necessary for a single main hull variation of the instant invention. That concept of a single main hull with no outrigger hulls, though not shown, is also considered well within the spirit and scope of the invention.

FIG. 27 gives a bow view of the instant invention beachable marine vehicle 30 shown in FIG. 24 but during high speed operation. While the outrigger hulls 41, 42 provide greater stability and more deck space, they are not absolutely necessary for a single main hull variation of the instant invention. That concept of a single main hull, though not shown, is also considered well within the spirit and scope of the invention.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an advanced beachable marine vehicle capable of beaching and then disembarking from a beach and containing a first water contacting hull member, the improvement comprising:

said advanced beachable marine vehicle at least partially supported upon a water surface by a first artificially pressurized gas cushion at least partially disposed in an underside of the first water contacting hull member, a first moveable, in relation to the advanced beachable marine vessel, secondary bow member disposed, at least in its majority, forward of the first artificially pressurized gas cushion wherein upward movement of said first moveable secondary bow member raises the first moveable secondary bow member leaving a first forward opening in the first water contacting hull member thereby allowing discharge of cargo from the first forward opening in the first water contacting hull member.

2. The advanced beachable marine vehicle of claim 1 wherein an aft portion of the first moveable secondary bow member, when in its lowered high speed position, is, on average, disposed lower than a forward portion of the first artificially pressurized gas cushion.

3. The advanced beachable marine vehicle of claim 1 wherein the first moveable secondary bow member overlaps lower portions of the first water contacting hull member of the advanced beachable marine vehicle over at least a majority of a width of the first moveable secondary bow member.

4. The advanced beachable marine vehicle of claim 1 wherein a bow portion of the first water contacting hull member extends forward further than the first moveable secondary bow member.

5. The advanced beachable marine vehicle of claim 1 wherein the first moveable secondary bow member is, at least in part, hinged to the first water contacting hull member.

6. The advanced beachable marine vehicle of claim 1 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 60 degrees.

7. The advanced beachable marine vehicle of claim 1 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 50 degrees.

8. The advanced beachable marine vehicle of claim 1 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 40 degrees.

9. The advanced beachable marine vehicle of claim 1 wherein a cargo deck is disposed below a main deck of the advanced beachable marine vehicle and proximal to and, at least in its majority, above a first artificially pressurized gas cushion recess.

10. The advanced beachable marine vehicle of claim 9 wherein sides of the first artificially pressurized gas cushion recess, at least in their majority, taper inward toward a vertical centerline plane of the first water contacting hull member.

11. The advanced beachable marine vehicle of claim 1 which further comprises a first forward moveable, in relation to the advanced beachable marine vehicle, ramp wherein said first forward moveable ramp acts as a portion of a bow of the first water contacting hull member when the first moveable secondary bow member is in an upward position.

12. The advanced beachable marine vehicle of claim 1 wherein the first forward moveable ramp deploys downward to allow discharge of cargo from the first forward opening in the first water contacting hull member.

13. The advanced beachable marine vehicle of claim 1 which further comprises a moveable, in relation to the advanced beachable marine vehicle, first stern ramp disposed proximal an aft end of the first water contacting hull member wherein said first stern ramp acts to restrict water from entering a cargo area of the first water contacting hull member when in its upward position and allowing cargo loading when in its downward position.

14. The advanced beachable marine vehicle of claim 1 wherein an aft end of the first artificially pressurized gas cushion is angled to horizontal over a majority of its width.

15. The advanced beachable marine vehicle of claim 1 which further comprises a second artificially pressurized gas cushion disposed in an underside of a second water contacting hull member.

16. The advanced beachable marine vehicle of claim 15 which further comprises a second moveable secondary bow member disposed, at least in its majority, forward of said second artificially pressurized gas cushion.

17. The advanced beachable marine vehicle of claim 15 wherein a lower aft end of a connecting hull portion that connects the first and the second water contacting hull members is angled to horizontal over a majority of its width.

18. The advanced beachable marine vehicle of claim 1 which further comprises a first stabilizing outrigger hull disposed, at least in its majority, outboard of the first water contacting hull member.

19. The advanced beachable marine vehicle of claim 18 which further comprises a second stabilizing outrigger hull disposed, at least in its majority, outboard of the first water contacting hull member.

20. The advanced beachable marine vehicle of claim 1 which further comprises a locking means to lock the first moveable secondary bow to the first water contacting hull member when the first moveable secondary bow is in its lower position wherein said locking means is disposed proximal a forward end of the first water contacting hull member.

21. The advanced beachable marine vehicle of claim 1 which further comprises a locking means to lock the first moveable secondary bow to the first water contacting hull member when the first moveable secondary bow is in its lower position wherein said locking means is disposed proximal a forward end of the first moveable secondary bow.

22. In an advanced beachable marine vehicle capable of beaching and then disembarking from a beach and containing a first water contacting hull member, the improvement comprising:

said advanced beachable marine vehicle at least partially supported upon a water surface by a first artificially pressurized gas cushion at least partially disposed in an underside of the first water contacting hull member, a first moveable, in relation to the advanced beachable marine vessel, secondary bow member disposed, at least in its majority, forward of the first artificially pressurized gas cushion and wherein a bow portion of the first water contacting hull member extends forward further than the first moveable secondary bow member.

23. The advanced beachable marine vehicle of claim 22 wherein upward movement of said first moveable secondary bow member raises the first moveable secondary bow member leaving a first forward opening in the first water contacting hull member thereby allowing discharge of cargo from the first forward opening in the first water contacting hull member.

24. The advanced beachable marine vehicle of claim 22 which further comprises a locking means to lock the first moveable secondary bow to the first water contacting hull member when the first moveable secondary bow is in its lower position wherein said locking means is disposed proximal a forward end of the first water contacting hull member.

25. The advanced beachable marine vehicle of claim 22 which further comprises a locking means to lock the first moveable secondary bow to the first water contacting hull member when the first moveable secondary bow is in its lower position wherein said locking means is disposed proximal a forward end of the first moveable secondary bow.

26. The advanced beachable marine vehicle of claim 22 wherein an aft portion of the first moveable secondary bow member, when in its lowered position, is, on average, disposed lower than a forward portion of the first artificially pressurized gas cushion.

27. The advanced beachable marine vehicle of claim 22 wherein the first moveable secondary bow member overlaps lower portions of the first water contacting hull member of the advanced beachable marine vehicle over at least a majority of a width of the first moveable secondary bow member.

28. The advanced beachable marine vehicle of claim 22 wherein the first moveable secondary bow member is, at least in part, hinged to the first water contacting hull member.

29. The advanced beachable marine vehicle of claim 22 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 60 degrees.

30. The advanced beachable marine vehicle of claim 22 wherein, on average when keels .of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 50 degrees.

31. The advanced beachable marine vehicle of claim 22 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 40 degrees.

32. The advanced beachable marine vehicle of claim 22 wherein a cargo deck is disposed below a main deck of the advanced beachable marine vehicle and proximal to and, at least in its majority, above a first artificially pressurized gas cushion recess.

33. The advanced beachable marine vehicle of claim 32 wherein sides of the first artificially pressurized gas cushion recess, at least in their majority, taper inward toward a vertical centerline plane of the first water contacting hull member.

34. The advanced beachable marine vehicle of claim 22 which further comprises a first forward moveable, in relation to the advanced beachable marine vehicle, ramp wherein said first forward moveable ramp acts as a portion of a bow of the first water contacting hull member when the first moveable secondary bow member is in an upward position.

35. The advanced beachable marine vehicle of claim 22 which further comprises a second artificially pressurized gas cushion disposed in an underside of a second water contacting hull member.

36. The advanced beachable marine vehicle of claim 35 which further comprises a second moveable secondary bow member disposed, at least in its majority, forward of said second artificially pressurized gas cushion.

37. The advanced beachable marine vehicle of claim 22 which further comprises a first stabilizing outrigger hull disposed, at least in its majority, outboard of the first water contacting hull member.

38. The advanced beachable marine vehicle of claim 37 which further comprises a second stabilizing outrigger hull disposed, at least in its majority, outboard of the first water contacting hull member.

39. In an advanced beachable marine vehicle capable of beaching and then disembarking from a beach and containing a first water contacting hull member, the improvement comprising:
said advanced beachable marine vehicle at least partially supported upon a water surface by a first artificially pressurized gas cushion at least partially disposed in an underside of the first water contacting hull member and wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 60 degrees and wherein a cargo deck is disposed below a main deck of the advanced beachable marine vehicle and proximal to and, at least in its majority, above a first artificially pressurized gas cushion recess.

40. The advanced beachable marine vehicle of claim 39 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 50 degrees.

41. The advanced beachable marine vehicle of claim 39 wherein, on average when keels of the advanced beachable marine vehicle are substantially horizontal and over a vertical distance of at least four inches and over a majority of a width of lower forward portions of the first artificially pressurized gas cushion, forward rising surfaces bordering the first artificially pressurized gas cushion, are angled aft at an angle to horizontal of less than 40 degrees.

42. The advanced beachable marine vehicle of claim 39 which further comprises a first moveable, in relation to the advanced beachable marine vessel, secondary bow member disposed, at least in its majority, forward of the first artificially pressurized gas cushion wherein upward movement of said first moveable secondary bow member raises the first moveable secondary bow member leaving a first forward opening in the first water contacting hull member thereby allowing discharge of cargo from the first forward opening in the first water contacting hull member.

43. The advanced beachable marine vehicle of claim 42 wherein the first moveable secondary bow member, when in its lowered position, overlaps lower portions of the first water contacting hull member of the advanced beachable marine vehicle over at least a majority of a width of the first moveable secondary bow member.

44. The advanced beachable marine vehicle of claim 42 wherein a bow portion of the first water contacting hull member extends forward further than the first moveable secondary bow member.

45. The advanced beachable marine vehicle of claim 39 wherein sides of the first artificially pressurized gas cushion recess, at least in their majority, taper inward toward a vertical centerline plane of the first water contacting hull member.

46. The advanced beachable marine vehicle of claim 39 which further comprises a first fixed bow member disposed forward of the first artificially pressurized gas cushion recess.

47. The advanced beachable marine vehicle of claim 39 which further comprises a second artificially pressurized gas cushion disposed in an underside of a second water contacting hull member.

48. The advanced beachable marine vehicle of claim 39 which further comprises a first stabilizing outrigger hull disposed, at least in its majority, outboard of the first water contacting hull member.

49. The advanced beachable marine vehicle of claim 48 which further comprises a second stabilizing outrigger hull disposed, at least in its majority, outboard of the first water contacting hull member.

* * * * *